March 15, 1932.                    E. SHERRILL                    1,849,960
                    METHOD FOR THE DETERMINATION OF POTASSIUM
                             Original Filed Dec. 22, 1925
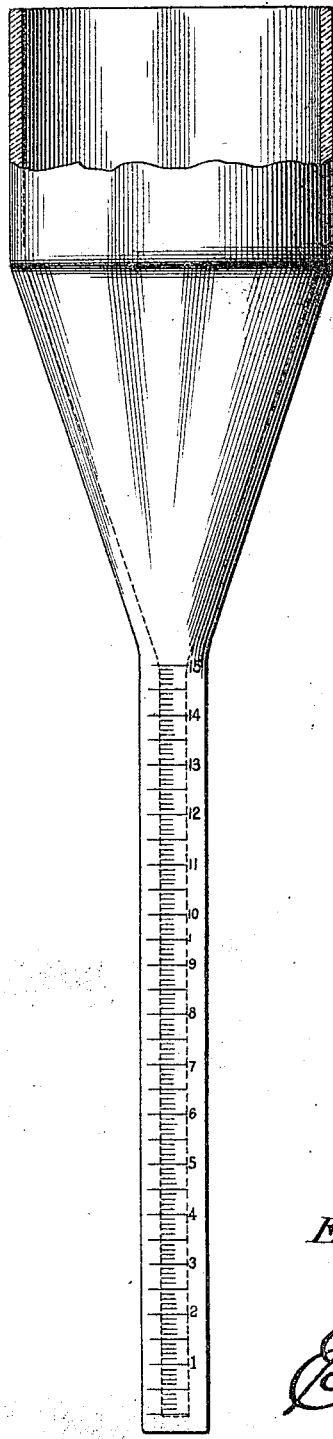
Witness
Howard D. Orr
Elmer Sherrill,
Inventor,
E. G. Siggers
Attorney Patented Mar. 15, 1932

1,849,960

UNITED STATES PATENT OFFICE

ELMER SHERRILL, OF SANTA ANA, CALIFORNIA

METHOD FOR THE DETERMINATION OF POTASSIUM

Application filed December 22, 1925, Serial No. 77,073. Renewed May 9, 1930.

My invention relates to an improved and quick method for the determination of the chemical element potassium, particularly as it occurs in combination in various commercial mixtures.

The purposes of the invention comprises not only a new type of method of determining the quantity of potassium, but also the provision of reagent solutions of such concentration and at such temperature as to make the method accurate, and, finally, an apparatus so constructed and proportioned as to make the method volumetric rather than gravimetric.

Gravimetric methods for the determination of potassium are well known. The most common of these requires a chloride of platinum as the precipitating reagent. The precipitated potassium chlorplatinate is filtered, washed carefully with alcohol, dried thoroughly and then weighed on an analytical balance. The operation, while exacting and time-consuming, has been in general use for many years. There was no satisfactory volumetric (quick) method of determining potassium previous to my invention.

In my volumetric method, I precipitate the potassium as potassium sodium cobaltinitrite and almost immediately measure the volume of the precipitate. There is no filtering, no washing, no drying, no weighing of the precipitate. Only a few minutes' time is required for the complete analysis. The results are sufficiently accurate for commercial use, provided the conditions of concentration and temperature of precipitation and comparison of the unknown with a known quantity of potassium are such as discovered by me; and provided the precipitate is collected in an apparatus of such proportions as to ensure that all of the precipitate gets into the measuring tube, and that the percentage of error in reading the volume of the collected precipitate is negligible.

The discovery of a suitable concentration of potassium (or potash) solution and of the precipitating solution of sodium cobaltinitrite came only after many careful experiments. At first there seemed to be no fixed relation between the volume of the precipitated cobaltinitrite and its content of potassium. The explanation is perhaps the variable composition of the precipitate as formed under various conditions. Depending on the concentrations and amounts of the solutions used, one gets either $$K_3Co(NO_2)_6$$
$$K_2NaCo(NO_2)_6$$
or $$KNa_2CO(NO_2)_6.$$

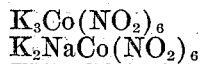

It is essential, therefore, to make the precipitation under nearly or quite identical conditions in order to have the same composition of the precipitate in successive tests. I have found suitable concentrations to be potassium equivalent to 1 g. of potash ($K_2O$) dissolved in 99 g. of water and sodium cobaltinitrite solution of this composition: 13.23 grams sodium nitrite, 7.35 grams cobalt acetate, and 3 cc. glacial acetic acid, these three being dissolved in enough water to give 100 cc. of solution. Further details of the preparation of this solution are given later.

I have discovered also that the volumes of precipitate obtained from a given amount of potash are much different for temperatures below and above 70° F. My preliminary method, apparently in successful use, suddenly showed erratic results on cold fall nights. The precipitate on those cold nights was so voluminous as actually to overflow th measuring tube, whereas parallel tests in the afternoon showed less than a tubefull of precipitate from the same example. A temperature of 70° F. was found to be critical. The test should be made at or above this point, at, say, 70 to 95° F., to avoid the inconsistent results due to the formation of a voluminous precipitate below the critical temperature. It is well known that many substances undergo a change of volume at certain critical temperatures. Thus sodium sulfate crystallizes as the anhydrous sulfate ($Na_2SO_4$) at temperatures above 91° F. (33° C.) but as a hydrated sulfate, such as ($Na_2SO_4.10H_2O$), at any lower temperature. Whether my discovery of the change in volume occupied by the potassium sodium cobaltinitrite below or above approximately 70° F. is based upon a similar change in the degree of hydration or upon a change in the size or system of crystals, I do not know; I avoid the possible error due to the change in apparent volume, as stated, simply by performing the test at some temperature above 70° F.

Discovery of the necessary temperature and concentration was not sufficient to develop a quick volumetric method for determining potassium. I had to devise a process in which the precipitated potassium cobaltinitrite and the supernatant liquor were centrifuged in order better to settle the precipitate and to make certain the same degree of compactness, in successive tests, before measuring the vloume of that precipitate.

None of the centrifugal tubes on the market or disclosed in the prior art was satisfactory. These tubes were for entirely different tests, such as determining the water content of butter, mud in petroleum oil, etc. It was necessary to invent an entirely new centrifuge tube before results of any interest at all commercially could be had in determining potash volumetrically.

It is understood that a quantitative analysis has for its sole purpose the determination of the amount of a substance present. A process which fails to show this amount with sufficient accuracy and leads to large errors is not a satisfactory method, but a great misfortune. An analysis on a ship load of 10,000 tons of potash, at $40 a ton, if in error by 2% of the correct amount, would involve a financial loss of $8,000. Such errors cannot be tolerated. But such errors are small in comparison with those caused by the use in my method of any type of centrifuge tube known at the time of my invention.

In the accompanying drawing is illustrated a side view of the tube drawn on a scale of approximately two to one.

The tube comprises a bowl, a stem, and an inclosed tapering section connecting the stem and bowl, all in one piece. The divisions on the stem represent percentages of potash.

There were two chief difficulties with these older tubes, for my purpose. First, none of them makes possible a sufficiently accurate measurement of the volume of precipitate. From the solutions of concentrations which give consistent volumes of precipitate there is formed less than 1 cc. of precipitate for each 100 cc. of solution. An error of .05 cc. in reading the volume of 1 cc. of precipitate corresponds to one-twentieth or 5% of the total potash present. Second, some of the known types of centrifuge tubes had shoulders at the union of the graduated stem to the upper larger part or bowl of the tube. Some of my precipitate would lodge on this relatively flat shoulder and not slip off into the graduated measuring tube, even on long centrifuging.

The means of overcoming these objections will appear from a study of my new centrifuge tube. First, the measuring tube is long and narrow with a flat bottom. Experiments determined that its total volume should be less than 2% of the volume of the bowl. Yet this 2% or less of the volume has a height which is more than that of the other 98% of the volume. The inside diameter of this measuring tube should be about .088 to 0.100 inch. The volume of the bowl should be about 30 cc. Second, the shoulder of certain other tubes has been replaced by a taper so steep that no precipitate lodges on it. My experiments have shown that no part of this taper should make an angle of more than 20° with a line parallel to the length of the tube.

The detailed description of the preferred method of carrying out my invention now follows:—

Five cc. of an approximately 1 per cent $K_2O$ solution of the sample are transferred to a potash centrifuge tube (shown in drawing) containing 17 cc. of specially prepared sodium cobaltic nitrite solution. To a similar tube add 5 cc. of a standard 1 per cent potash ($K_2O$) solution. Centrifuge both at once in a Babcock milk test hand centrifuge at 1000 r. p. m. for 1 min. Observe each tube, tap gently with the finger to level the surface of the precipitate, and centrifuge again for 15 sec. Calculate results by the formula:

$$\frac{\text{Cc. to which sample is diluted} \times \text{reading of sample}}{\text{Gram of sample in above solution} \times \text{reading of standard}} = \text{per cent } K_2O$$

*Standard potash ($K_2O$) solution.*—Dissolve 15.83 g. of highest purity potassium chloride in distilled water in a liter volumetric flask, add 8 or 10 drops of C. P. glacial acetic acid, dilute to the mark, and mix thoroughly.

*Sodium cobaltic nitrite.*—To 450 g. of C. P. sodium nitrite in a large wide-mouth bottle add 800 cc. of distilled water. Let stand over night, or longer, with occasional stirring. In a similar manner treat 250 g. of C. P. cobalt acetate with 800 cc. of distilled water. As soon as the sodium nitrite is all dissolved pour it into the cobalt acetate solution. Mix well and dilute to 2 liters. This solution keeps well for months.

To prepare the solution for use add 65 cc. of water and 5 cc. of glacial acetic acid to 100 cc. of stock solution, mix, and let stand over night before using. It does not keep well, and a new solution should be prepared every 3 or 4 days.

*Sodium hydroxide solution.*—Prepare 500 cc. of 10 N solution. A saturated solution of sodium carbonate is sometimes used instead.

The effect of variable speeds of the centrifuge in compacting the precipitate to different degrees is offset by comparing the volume of precipitate from a known amount of potash with that from the unknown, centrifuged at the same time.

Soluble potash (that is potash soluble in water) in a great variety of compounds or mixtures may be determined by my method. Adjustment of the acidity or alkalinity to correspond to a few drops of acetic acid in one hundred cc. of the potash solution is made in a manner which needs no explanation to those skilled in the art.

Although the method has been especially successful in determinations of potassium, the invention may be used also in other analyses, for measuring the volumes of precipitates in order to render unnecessary the usual tedious steps of filtering, washing, drying and weighing.

I use the Babcock hand centrifuge for settling the precipitate of potassium sodium cobaltinitrite into the measuring tube prior to reading the volume. This centrifuge is readily available at a low price. My tube is so proportioned that it can be fitted into this inexpensive centrifuge, the accuracy of the test being maintained, in spite of the small size of the tube, by the very fine bore of the measuring portion.

This degree of accuracy is further increased by a flat end on the bottom of the measuring tube to make calibration of the volume of the measuring tube more convenient and certain than would be the case if the tube had a rounded bottom with the internal diameter decreasing gradually to zero at the end.

This application is a continuation in part of my application filed September 7, 1920, Serial No. 408,446, for improvement in centrifugal tubes.

Having now described my invention in such manner that one skilled in the art may quickly determine the volume of a precipitate and having given an illustration of the invention in the form of specific details for determining potassium, I claim:—

1. The method for the quantitative determination of potassium which comprises the comparison of the relative volumes of the precipitates of potassium sodium cobaltinitrite formed by the unknown and by a known quantity, respectively, of potassium, said comparison being made in centrifuge tubes, the tubes containing the unknown and the known having been subjected to the same centrifugal force by being whirled in a centrifuge at the same time.

2. The volumetric method for the quantitative determination of potassium which comprises precipitating potassium sodium cobaltinitrite using a known quantity of potassium; producing another precipitate of potassium sodium cobaltinitrite using an unknown quantity of potassium; placing the respective precipitates in centrifuge tubes having funnel-shaped upper ends and so inclined as to prevent deposition of the precipitate on the inner walls of the funnels; simultaneously subjecting said tubes to the same centrifugal force; measuring the quantity of the precipitates in said centrifuge tubes; and comparing the measured quantities.

3. That method of determining potassium quantitatively, which consists in adding to a given volume of sodium cobaltinitrite solution a known volume of a solution to be tested; adding to the same volume of sodium cobaltinitrite solution a like volume of a solution having a known content of potassium; placing the respective mixtures into centrifuge tubes each having a closed lower end; spinning the tubes simultaneously in a centrifuge under like conditions; and comparing the volumes of the precipitates produced in said tubes.

In testimony that I claim the foregoing as my own, I have hereto affixed my signature.

ELMER SHERRILL.